Figure 1:
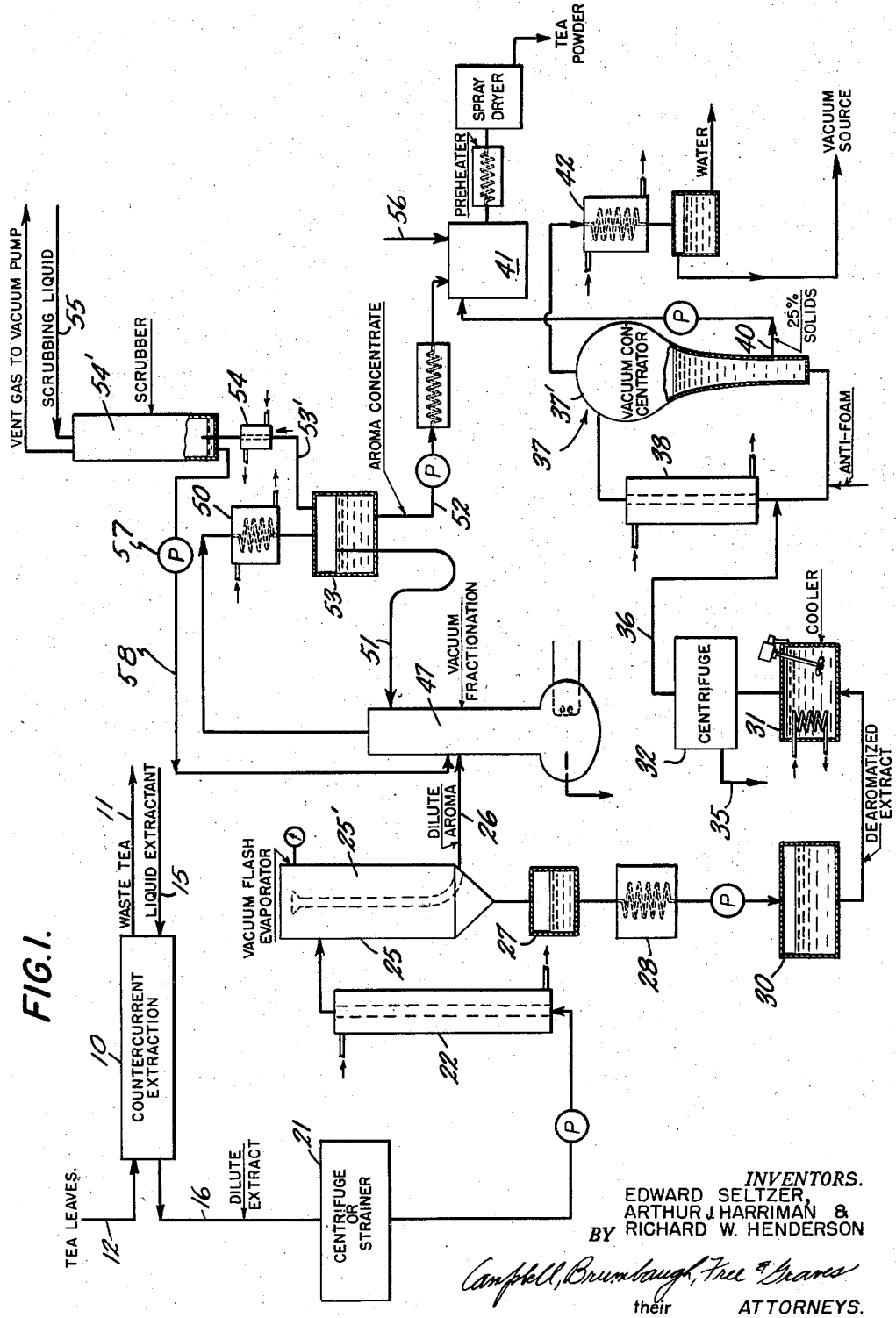

United States Patent Office 2,891,865
Patented June 23, 1959

2,891,865

PROCESS FOR PREPARING A SOLUBLE TEA PRODUCT

Edward Seltzer, Teaneck, Arthur J. Harriman, Glen Ridge, and Richard W. Henderson, Rahway, N.J., assignors to Thomas J. Lipton, Inc., Hoboken, N.J., a corporation of Delaware Application December 21, 1955, Serial No. 554,533

15 Claims. (Cl. 99—77)

This invention relates to tea concentrates and powders and especially to those suitable for being dissolved in cold water to make iced tea.

Existing commercial "soluble" tea powders manufactured according to a variety of known procedures have the disadvantage of needing to be dissolved in warm or hot water before cooling to cold beverage temperature in order to produce a desired degree of solution of the powder in the water. Moreover, even when the tea has been brewed in warm or hot water and then chilled, a precipitate or "cloud" will form, the effect being known as "creaming." Liquid tea extracts having a substantially larger concentration of soluble tea solids than in the beverage as consumed exhibit a tendency to cloud or produce sediment on storage, especially at low temperatures. The phenomenon also manifests itself in the production of the tea extract, specifically during the process of concentrating and cooling, and has been attributed to the formation of a compound of tannins with caffeine called the "caffeine-polyphenol complex." Clouding or creaming has been a serious obstacle to the preparation of a stable commercial tea concentrate and to acceptability by the consumer of soluble tea powders for use in cool beverages.

It has been proposed to decrease or eliminate the objectionable clouding by incorporating certain agents in the concentrate which are said to have the property of maintaining the insoluble ingredients in solution. For instance, the art discloses the use of carbohydrates, mixtures of sucrose and glucose, and various chemicals to adjust the pH for that purpose. In other instances, it has been proposed to extract the tea with cold rather than with hot water to avoid the presence of the less soluble ingredients which cause the clouding. However, all of those processes result in products which possess inferior flavor, inferior color, unwanted sweetness and other disadvantages.

An object of the present invention is to produce a tea concentrate or powder having aroma and flavor of freshly brewed tea but which does not produce clouding when mixed with cold water.

A particular object and advantage of the invention is provision of a process according to which it is possible to realize the foregoing object without use of added agents which may affect or obscure the desired flavor and aroma of the tea.

Another object of the invention is to produce soluble tea powders that are directly soluble in cool tap water without the need for predissolving in hot water and subsequent cooling.

A still further object and advantage is the preparation of a tea extract or powder that can be used for preparing strong tea beverages at low temperatures without the appearance of clouding.

Still another object of the invention is to produce such a tea concentrate or powder from tea leaves, while still retaining in the concentrate substantially all of the desirable characteristics present in tea freshly brewed from the leaves.

The highest grade teas in the past have been made from the leaf bud and the immediately adjacent stems and leaves from choice gardens. Lower grade teas are made from less suitable leaves and leaves of plants of growing areas and plantations which naturally produce "common" teas, that have inferiority attributable to too pungent and harsh character. A still further object of this invention is to remove fractions of the flavor that have the conspicuous inferior character, thereby making possible the use of the remainder directly or as parts of blends; and to provide a method of improving or mellowing extracts made from low grade teas.

In practicing the invention, the tea leaves are steeped in a hot solvent, such as water, thereby to extract a large part of the soluble ingredients from the tea and produce a liquid extract which has a concentration of soluble tea solids (as more fully discussed hereinafter) substantially greater than in tea normally brewed for beverage consumption. The extract is then cooled to a temperature below about 100° F. at which heavy clouding (or creaming) or separation of a part of the extracted solid material from the solution occurs. The low temperature is maintained for sufficient time to effect precipitation or "clouding" of the desired amount of tea solids, preferably until the system has reached substantial equilibrium between the solution and the separated solids. Thereafter, the separated solids are removed from the suspension by a procedure described in greater detail below.

By controlling the clouding operation so that only a certain amount of total solids in solution are removed, the flavor of the tea is preserved and undesirable clouding of the tea during use is avoided. Moreover, if the extract is made from low grade tea leaves, the removal of soluble tea solids in the amounts specified herein will produce an extract more comparable to the extract from teas of a considerably higher grade, e.g., medium to best quality. The extract, after having been subjected to the cream removal treatment, is preferably concentrated by a procedure designed to retain substantially all of the desirable ingredients, including flavor and aroma, although the decreamed extract, which has a tea solids concentration substantially higher than beverage tea, may be used as such without further concentration.

The product of the invention is an extract, concentrate or powder of the components of tea leaves which have been removed by extraction in hot water and from which have been separated those ingredients normally present in a tea extract which cause clouding and separate from solution at beverage strength at temperatures below about 60° F. The concentrate otherwise contains the ingredients of a hot water extract of tea leaves and, in the case of the extract of low grade leaves, the concentrate, as contrasted with the extract, will be free of excessive amounts of ingredients producing bitterness and astringency, thereby unmasking the desirable flavor of other ingredients and improving the tea.

A tea concentrate, in order to have the flavor and aroma of freshly steeped tea, must have a balanced concentration of aromatics, tannins and caffeine. Even in the case of tea of higher quality, if it has been subjected to prolonged steeping (which may be desirable or even necessary in an economical process), excessive amounts of the tannins may be removed from the tea leaves thereby producing an extract that results in an overly astringent beverage. The property of astringency is attributed to the tannins and bitterness to the caffeine. While it will be apparent that the presence of those ingredients in excess will be objectionable, it is equally true that their complete absence will adversely affect the flavor of the tea. Hence, according to the invention, the cooling conditions are maintained so as to arrive at a product which has a reasonably good balance in respect of aroma, astringency and bitterness as well as the desired stimulating effect.

The tea leaves used in practicing the invention may have been processed and dried according to standard procedures. The tea leaves chosen may be black or fully fermented varieties such as Ceylon, South India, or Indonesia, or others, or mixtures thereof or with other teas. Oolong or semi-fermented teas such as Formosa may be used. The leaves may be whole or comminuted, for example, even to a powder. In order to provide an extract that has a concentration in the proper range to render it amenable to the controlled creaming treatment of the invention, the extracting operation is preferably carried out so as to produce a concentration of the soluble ingredients of the tea leaves in the solution within a particular range. This object may be realized by the use of hot water counter-current or continuous extraction procedures or by multiple fresh water contacts or equivalent procedures. The process of the invention will find the greatest advantage and applicability when the extract has at least about 3% hot water-soluble solids. The concentration of soluble tea ingredients may be as high as saturation at the temperature prevailing in the extractor. Part of the water may be removed from the extract prior to "creaming," thereby to increase the concentration of the solution and increase the temperature of creaming at which the desired amount of precipitate will be formed.

The temperature to which the tea solution is cooled and at which the precipitate or cream is removed in operating according to the invention may depend, to a substantial degree, upon the particular type of tea and the particular quality desired in the end product. The temperatures indicated for "decreaming," i.e., separation of precipitated insoluble solids, are those corresponding with substantial equilibrium between dissolved and precipitated tea solids. Most suitably, the tea extract should be treated by cooling to a temperature below about 100° F., holding for time sufficient to approach equilibrium, preferably with mild agitation, and removing the precipitate at such temperature. Holding times of about one-half hour are usually sufficient, but longer times, e.g., up to three hours, may be used. Lower temperatures will result in precipitation and removal in greater amounts and of different proportions of the various ingredients in the extract. The temperature of the clouding treatment is controlled, therefore, in conjunction with the concentration of tea solids in the extract and the type of tea to effect removal of solids from solution in amount which will prevent cloudiness in the beverage tea produced from the tea concentrate powder or extract, without detracting appreciably from the desired flavor qualities of the tea. As a general rule, at least about 5%, preferably at least 10%, of the solids present in the extract should be precipitated and removed. Accordingly, the temperature of decreaming is preferably below about 85° F. However, excessive removal of solids may lead to an inferior product by reason of low content of the flavor and color-producing ingredients. Accordingly, the clouding and subsequent clarifying operation should be controlled to provide no greater than about 25% removal of solids, preferably below about 20%. Hence, it is preferred that the amount of tea solids removed be in the range from about 10 to about 20%. Having in mind in particular the objective of maintaining and even improving the flavor of the tea, the solution having at least 3% content of soluble tea solids is deprived of precipitated solids (decreamed) at a temperature not below 45° F., while preferred decreaming temperatures are found above about 70° F.

The preferred method for separating the cloud-forming precipitate from the tea extract is by centrifuging, and Westfalia clarifier Model No. KDD604 has been found to be satisfactory. When the Westfalia clarifier is used, the liquid may be fed to it at the rate of 3 pounds per minute (21.5 gallons per hour). The centrifuge bowl holds 4.2 pounds and rotates at 10,000 r.p.m. It has an inside diameter of 6¼ inches, producing a maximum centrifugal force of 9,000 times gravity. The temperatures of the liquid at the inlet and at the outlet are measured, and the average is taken as the decreaming temperature. It is preferred to operate the centrifuge so that there is no air space within the bowl nor an air gap at the bowl discharge. Such air spaces tend to interfere with the separation and aerate the tea, thereby causing deterioration of flavor and color.

One procedure for carrying out the process of the invention is illustrated in the flow diagram attached hereto and designated Figure 1.

Reference number 10 indicates a counter-current extractor. The tea leaves are introduced to the extractor 10 at 12 and steeped in the hot extractant introduced at 15 at an elevated temperature and for time to produce an extract having a concentration of at least about 3% soluble tea solids. The extracted leaves are removed at 11.

The liquid withdrawn from extractor 10 through the pipe 16, designated as "dilute extract," may be passed through the strainer 21 to remove extraneous undissolved solid portions of the tea or other extraneous material, or may be centrifuged at elevated temperatures, e.g., about 140° F., for the same purpose. The dilute extract generally contains about 3½ to 5% soluble tea solids. It is then pumped through a jacketed heater 22 into a vacuum flash chamber 25', which is maintained at about 25 to 29 inches of mercury vacuum. The temperature of the evaporator effluent is 100 to 150° F. In the chamber 25' of evaporator 25 about 20% of the water is evaporated, along with volatile tea constituents, and is removed from the chamber through the pipe 26 and is designated as "dilute aroma." The unevaporated portion of the liquid, designated herein as "dearomatized extract," constituting about 80% of the feed, is collected in the tank 27, pre-cooled at 28 and pumped to the storage vessel 30. The dearomatized extract may contain about 4 to 6% of soluble tea solids.

The dearomatized extract is fed to the cooler 31, where its temperature is reduced sufficiently to produce precipitation of the desired amount of insoluble materials, i.e., produce "creaming." It is held in the cooler 31 at the creaming temperature for a time sufficient for the precipitate to form. It is then passed to a centrifuge 32, which is preferably of the type of the Westfalia clarifier described above. Insoluble precipitate is collected and periodically withdrawn at 35. The clear dearomatized extract flows through the pipe 36 to the vacuum concentrator 37, which may be of any generally known type intended for heat sensitive materials, suitably one which causes evaporation of liquid (in chamber 37') while material is being circulated continuously (from tubular heater 38) within it. It may operate, for example, at 26 to 29 inches of Hg vacuum and 150 to 100° F. effluent temperature. In place of the recirculating evaporator, a falling film evaporator with or without an internal agitator may be desirable and single pass and/or multiple stages may be provided. The effluent of the concentrator 37 (concentrated extract) contains about 25 to 50% tea solids and flows through the pipe 40 to the vessel 41. The distillate (primarily water) is condensed in a water-cooled condenser 42 and withdrawn.

The dilute aroma vapor flowing through the pipe 26 is introduced at an intermediate point of the fractionating column 47, which is heated at the base. The liquid flowing down the lower section of the column is stripped by the rising vapors from the reboiler at the bottom. The overhead vapors are condensed at 50. About 95% of the condensate collected in vessel 53 is returned to the top of the column as reflux through the pipe 51, and the remaining 5%, which is designated as "aroma concentrate" is pumped through the pipe 52 and after cooling is mixed with the concentrated dearomatized extract in the vessel 41. This aroma concentrate amounts to about 1% of the original dilute extract as fed to the heater 22.

From the vapor space above the liquid in the vessel 53, gases are withdrawn through a pipe 53' to a cooler 54 and into a scrubber 54'. In the scrubber, which may be packed with known types of packing, the ascending gases are met by a downwardly flowing liquid such as water, introduced at 55, which scrubs out uncondensed aromatic ingredients. The scrubber effluent is returned to the fractionating column 47 through a pump 57 and the pipe 58. The scrubbed non-condensible gas is withdrawn to the vacuum source.

The fluid in vessel 41, which is a mixture of aroma concentrate and concentrated extract, may be used as such to produce iced tea beverages free of cloudiness at beverage strength, even when diluted directly with cold water. However, it is optional, according to the invention, to produce a dry powder by spray drying according to the procedure now to be described.

Optionally, through a pipe 56 there may be added to the tank 41 an amount of carbohydrate syrup or powder such as clear, non-sweet (low percentage dextrose equivalent) corn syrup solids in amount that will be effective to retain in the tea powder the desirable aroma during the subsequent spray drying operation or to improve the wettability and solubility of the tea powder in cool water. The amount of such solids may suitably be equal to the amount of tea solids present in the liquid, thereby raising the total solids concentration to about 34 to 40%. The temperature of the liquid entering the spray dryer is preferably about 110 to 150° F., the liquid being preheated to this temperature if necessary.

The liquid is introduced to the spray dryer through an atomizer designed to disperse the liquid to small droplets, in accordance with known spray drying techniques. The air temperature in the dryer may be, for example, 300 to 500° F. at the inlet to the drying chamber and 200 to 300° F. at the outlet.

Although a procedure comprising vacuum flash evaporation and vacuum fractionation has been described for preparation of the aroma concentrate, this is not limiting. If desired or expedient, either or both of these process steps may be carried out under atmospheric pressure. However, to preserve the flavor and color of the tea, it is preferred to carry out the flash evaporation of dilute aroma under vacuum.

The creaming and separation of precipitated solids may be carried out on the dilute extract, or the concentrated extract if desired, by making suitable adjustments in the operating variables, especially creaming temperature, as previously explained.

Although as previously indicated, it is preferred to remove the cloud-forming precipitate from the tea extract using a high-speed centrifuge, other methods may be substituted within the spirit and scope of the invention. According to one embodiment of the invention, the clouding operation may be carried out at a temperature of about 45° F. or below, and even by freezing the extract. It has been found, according to this procedure, that the fine particles constituting the cloud, which are almost spherical in shape and in the order of 1 micron in diameter (in fact, so small that they may be observed to be subject to Brownian movement), tend to agglomerate and form clumps of about 20 to 30 microns in diameter. In the subsequent steps intended to separate the solid from the liquid phase, such as filtration or centrifugation, the size of the agglomerates will determine, to a large extent, the ease with which separation may be effected, the larger agglomerates facilitating such separation.

Where the precipitate or cloud has been formed by freezing and thawing, there is almost complete absence of individual tiny particles or spheres. The cream is observed under the microscope to consist almost entirely of relatively large clumps which are in the order of 60 microns in diameter or larger.

Within the particular embodiment of the invention just described, it is contemplated that after the clouding operation at temperature of about 45° F. or below, the temperature of the suspension is preferably raised by about 20–60 degrees to a "tempering level" and at the tempering temperature the suspension is mildly agitated to promote equilibrium between the soluble and insoluble phase, without substantial disintegration of agglomerates of insoluble material. The tempering process is continued until substantial equilibrium has been obtained between precipitate and solution, and thereafter the solid phase is separated from the suspension.

In the tempering process, the cooled extract, after it has reached equilibrium conditions at the low temperature, is warmed to a temperature about 20–60 degrees above the cooling temperature and maintained at that temperature, preferably with mild agitation, until the solid phase has reached equilibrium with the solids that are still in solution. Some of the initially precipitated solids go back into solution at the tempering temperature, thereby providing a control on the extent of overall precipitation and solids removal. In carrying out the tempering step, the tempering temperature may be adjusted depending upon the amount of clouding that has already occurred, so as to control the amount of separated solids within the ranges set forth above.

Following are examples of the manner in which the method of the invention may be carried out and of the product obtained.

EXAMPLE 1

A tea extract is prepared by hot countercurrent extraction of Ceylon black tea. The extract, after the tea dust or sediment has been filtered out, has about 4% tea solids. Aroma is removed, concentrated and conserved. The tea extract is warm (about 140° F.). Creaming is then produced according to Alternatives A, B and C as follows:

Alternative A

A portion of the extract is cooled rapidly to 75° F. and maintained at that temperature for one hour while being agitated to establish equilibrium between solid and liquid phases. A heavy "cloud" suspension forms during this cooling treatment.

Alternative B

Another portion of the extract is cooled without agitation to about 40° F. in a refrigerator for one hour and then is warmed slowly to 75° F. with gentle agitation. It is tempered at 75° F. for one hour to establish equilibrium between dissolved and precipitated solids.

Alternative C

A third portion of the extract is frozen and maintained in frozen condition for several hours. The frozen extract is then slowly thawed and warmed to 75° F. and gently agitated for one hour at this temperature to establish equilibrium.

Each of the above three extracts contains 13 to 17% of the tea solids as "cream" or precipitate. Portions of each of the three materials are introduced to a Westfalia centrifuge, model KDD604, equipped with a four-chamber bowl. The first extraction (A) is fed at the rate of 24 to 26 gallons per hour consistent with a clean non-cloudy product. The second extraction (B) permits a feed rate of 30 to 40 gallons per hour with complete clarification. The third extraction (C) is clarified at a feed rate of 67 gallons per hour. This latter rate may be substantially exceeded. All of the above rates are considered practical. Each of the clarified products obtained by alternative procedures A, B and C is suitable for preparing a concentrate or powder which will readily dissolve in cold water to produce a beverage cold tea which is free of undesirable cloudiness. By restoring the aroma to the tea concentrate, or to a tea concentrate from which a powder is made, one obtains a tea product having substantially all of the desirable flavor qualities of a tea produced from freshly brewed tea leaves without the undesirable cloudiness of the latter when preparing a cold beverage.

EXAMPLE 2

An extract of South India tea is prepared. The extract contains 5% by weight of tea solids. Aroma is removed, concentrated and conserved. The dearomatized extract is "creamed" according to the Alternative C procedure described above comprising freezing, thawing and tempering. The tempering is carried out at 82° F. About 14% of the total tea solids in solution are precipitated. The precipitate is filtered, employing a laboratory size plate and frame filter press. The cloths of the filter are coated with a pre-treated diatomaceous earth (acid and alkali-washed) and some is added to the liquid to the extent of about 1% of the liquid weight. The filtration proceeds at a practical rate. The filtrate is concentrated and spray-dried to a powder, which powder will dissolve completely in cold water to produce beverage tea which is free of undesirable cloudiness. By restoring the aroma to the tea concentrate before drying, one obtains a powder having substantially all of the flavor qualities of fresh tea prepared from tea leaves.

EXAMPLE 3

Sumatra black tea is extracted with hot water to produce an extract having a soluble tea solids content of 4.1%.

Fine insoluble material is removed by passing the extract through a centrifuge at a temperature of about 140° F. It is then passed through a vacuum flash evaporator operated at a vacuum of 27 inches of mercury, and about 20% of the extract feed is removed as a dilute aroma vapor. The remaining 80% of the extract, which contains 5.2% soluble tea solids, is divided into three portions, A, B and C, for decreaming, and each portion is cooled to a different creaming temperature and maintained at such temperature for one hour while slowly stirring the liquid. The creamed extracts are then passed through a Westfalia KDD604 four-chamber centrifuge at the rate of about 19 gallons per hour. The temperatures of the liquids are measured at the inlet and at the outlet of the centrifuge and the arithmetic average (which approximates the respective temperatures) is taken as the actual decreaming temperature. The affluent of the centrifuge is clear. The precipitated or creamed solids are removed from the centrifuge bowls, dried and weighed. The decreamed dilute extract is concentrated in a vacuum concentrator operated at 27 inches of mercury vacuum, to produce a concentrated extract having about 25% soluble tea solids. The dilute aroma vapor is withdrawn from the vacuum flash evaporator and introduced to an aroma concentrating column operated in tandem with and under substantially the same pressure as the vacuum flash evaporator. The concentrated aroma is added to the concentrated decreamed extract to produce a liquid having 23% soluble tea solids. To the solution there is added corn syrup solids in amount equal on a dry basis to the weight of tea solids, which brings the total solids concentration up to 37%. The liquid then is fed to a spray dryer, after being pre-heated to a temperature of 130° F. The spray dryer is operated at a 440° F. inlet air temperature and a 225° F. outlet air temperature. A powdered tea product is recovered. A sample of each of the tea powders is added to cold (50° F.) distilled water in amount to produce tea beverages having 0.4% tea solids, and is stirred for 15 minutes. The appearance, i.e., clarity, of the mixtures, is noted. The results of the three tests carried out at different decreaming temperatures are presented in the following table. As a control, a commercial tea powder, also containing corn syrup solids, is dissolved in distilled water (to a concentration of 0.4% tea solids) at 50° F., stirred for 15 minutes and then filtered.

| Sample | Decreaming Temp., °F. | Percent Solids Removed in Decreaming | Clarity of Beverage at 50° F. |
| --- | --- | --- | --- |
| A | 48 | 21.8 | Good. |
| B | 79 | 11.8 | Good. |
| C | 95 | 4.7 | Fair to poor. |
| Control | | | Very poor. |

Figure 2:
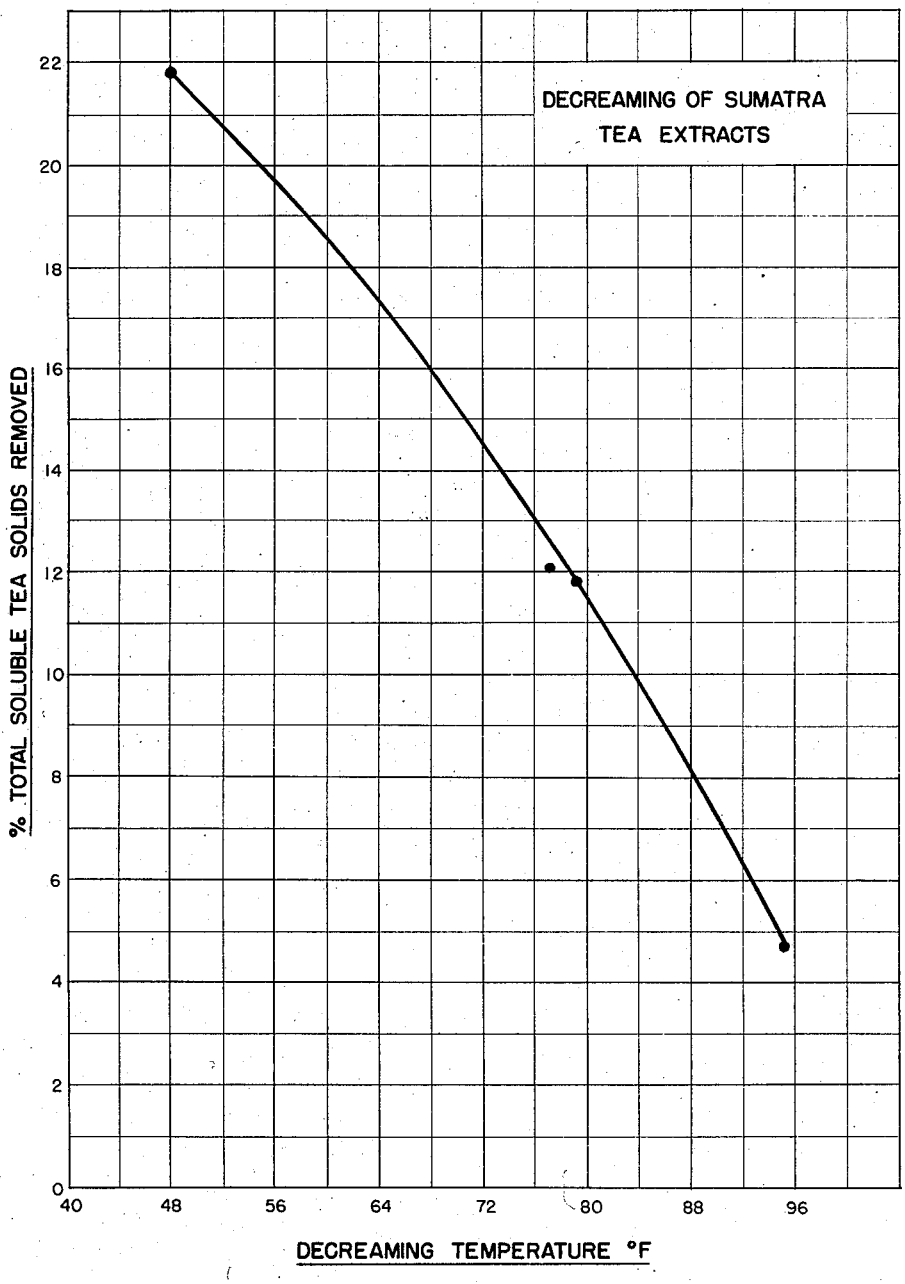

A graph of the percentage of total soluble tea solids removed versus average decreaming temperature is presented in Figure 2.

EXAMPLE 4

Figure 3:
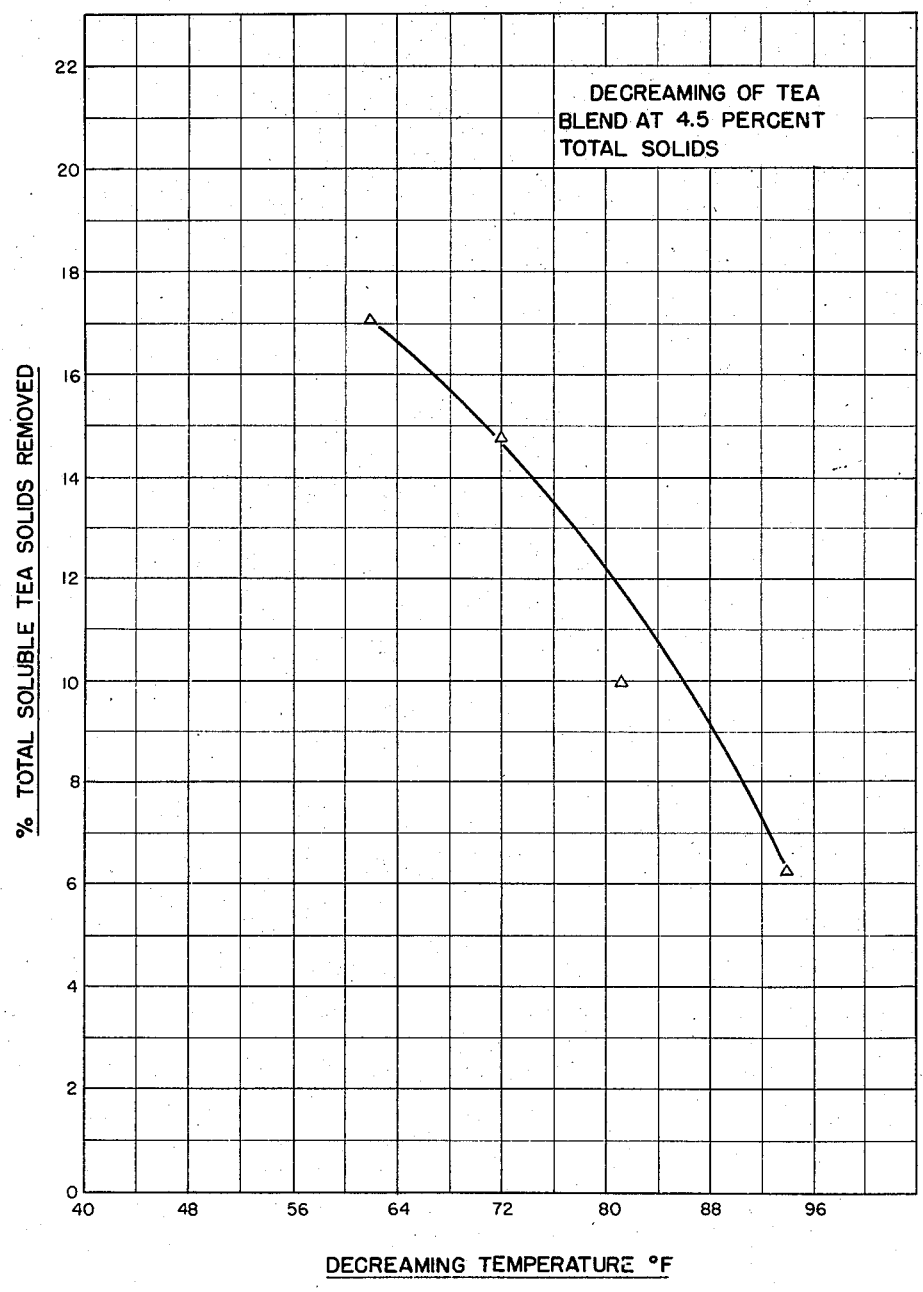

The procedure described in Example 3 is repeated using, instead of Sumatra black tea, a blend composed of 1 part of Ceylon black tea, 1 part of Java black tea and 1 part of South India black tea. The aroma and decreamed extract concentrating procedures described in Example 3 are also used. The concentrates are spray-dried to produce powders, as in Example 3. Tea beverages are produced in distilled water at 0.4% tea solids content at 50° F. The various products are evaluated against the commercial tea control described in Table 3, and the results are presented in the following table and graphically in Figure 3.

| Sample | Decreaming Temp., °F. | Percent Solids Removed in Decreaming | Clarity of Beverage at 50° F. |
| --- | --- | --- | --- |
| A | 62 | 17.1 | Good. |
| B | 72 | 14.7 | Good. |
| C | 94 | 6.2 | Fair. |
| Control | | | Very poor. |

Although specific embodiments of the invention have been outlined herein by example and description, it will be apparent that there are many modifications and equivalents within the spirit and scope of the invention. For example, other blends of different teas may be extracted, creamed, clarified and concentrated, or the individual teas may be so treated, and a blend prepared after concentrating them. Accordingly, it is intended that all such modifications and equivalents be included within the scope of the appended claims.

We claim:

1. In the production of a soluble tea product which has the flavor of freshly brewed tea from an aqueous solution of tea solids, the composition of solids in said solution consisting essentially of substantially all the solids in tea leaves which are soluble in hot water, the improvement which comprises cooling said solution to a temperature in the range of 45 to 100° F. at which "creaming" and separation of a part of the extracted solid material from the solution occurs, controlling said temperature thereby to control said creaming to effect separation of about 5 to 25% of the total tea solids as insoluble precipitate, and centrifuging said solution to remove substantially all of said solid material to produce a substantially clear solution of tea solids which are completely soluble and do not produce cloudiness at beverage strength in cold water.

2. The method of claim 1 in which the solution before creaming has a soluble tea solids content of at least 3%.

3. In the production of a soluble tea product which has the flavor of freshly brewed tea from an aqueous extract of tea leaves having at least about 3% content of soluble tea solids, the composition of solids in said solution consisting essentially of substantially all the solids in tea leaves which are soluble in hot water, the improvement which comprises cooling said extract to a temperature below about 100° F. but not below 45° F., at which "creaming" and separation of a part of the extracted solid material from the solution occurs, controlling said temperature thereby to control said creaming to effect separation of about 5 to 25% of the total tea solids as insoluble precipitate, and centrifuging said solution to remove substantially all of said solid material to produce a substantially clear solution, and removing at least a part of the remaining water from said solution to produce a tea product which is completely soluble and does not produce cloudiness at beverage strength in cold water.

4. In the production of a soluble tea product having improved flavor from tea leaves having inferiority attributable to too pungent and harsh character of the tea beverage, the steps of forming an aqueous solution of the soluble components of tea leaves, the composition of solids in said solution consisting essentially of substantially all of the solids in the tea leaves which are soluble in hot water, cooling said extract to a temperature in the range of 45 to 100° F. at which "creaming" and separation of a portion of the extracted solid material from the solution occurs, controlling said temperature thereby to control said creaming to effect separation of 5 to 25% of the total tea solids as insoluble precipitate, centrifuging said solution to remove substantially all of said solid material to produce a substantially clear solution of tea solids having flavor and quality substantially improved over the flavor and quality of the extract.

5. The method of claim 4 in which the solution before creaming has a soluble tea solids content of at least 3%.

6. The method of claim 3 in which substantially all of the solvent is removed from the concentrate to produce a powder.

7. The method of claim 1 in which the tea leaves are of medium to top quality.

8. The method of claim 1 in which the amount of solids removed is about 10 to 20%.

9. In the method of producing a tea product by steeping tea in a hot solvent thereby to extract a major portion of the soluble solid ingredients from the tea, the improvement which comprises cooling a solution of said tea solids to a temperature below about 45° F. at which "clouding" and precipitation of a portion of the extracted solid material from the solution and agglomeration of said separated solids occur, maintaining said temperature for a time sufficient to attain substantial equilibrium between the solution and said separated solids, thereafter increasing the temperature of the suspension by about 20-60 degrees to a tempering level, maintaining said tempering temperature with mild agitation sufficient to promote equilibrium between solubles and insolubles without substantial disintegration of agglomerates of insoluble material for a time sufficient to attain substantial equilibrium, and separating agglomerated insolubles from the suspension.

10. The method of claim 9 in which the extract is frozen prior to tempering.

11. The method of claim 9 in which the tempering temperature is about 75° F.

12. The method for producing a soluble tea product which has the flavor and aroma of freshly brewed tea from a solution of tea solids and aroma, the dissolved components of said solution consisting essentially of substantially all of the ingredients of tea leaves which are soluble in hot water, which comprises separating the major portion of said aroma from said tea solids and separately concentrating said aroma, cooling a solution of said tea solids to a temperature in the range of 45 to 100° F. at which "creaming" and separation of a part of the extracted solid material from the solution occurs, controlling said temperature thereby to control said creaming to effect separation of about 5 to 25% of the total tea solids as insoluble precipitate, centrifuging said solution to remove substantially all of said precipitate to produce a substantially clear solution, removing at least a part of the solvent from the de-creamed dearomatized solution and mixing the concentrated aroma with the concentrated solution of tea solids to produce a tea product which may be reconstituted to a cold tea beverage which is free of undesirable cloudiness and has substantially the flavor and aroma of freshly brewed tea.

13. The method of claim 12 in which substantially all of the water is removed from the mixture of concentrated aroma and concentrated tea solids to produce a powder.

14. The method of producing a soluble tea product which has the flavor of freshly brewed tea which comprises extracting from tea leaves substantially all the solids which are soluble in hot water, cooling said extract to a temperature in the range of 45 to 100° F. at which "creaming" and separation of a part of the extracted solid material from the solution occurs, controlling said creaming to effect separation of about 5-25% of the total tea solids as insoluble precipitate, and centrifuging said solution to remove substantially all of said solid material to produce a substantially clear solution of tea solids which are completely soluble and do not produce cloudiness at beverage strength in cold water.

15. In the production of a soluble tea product which has the flavor of freshly brewed tea from a mixture of tea solids and water, the composition of said mixture consisting essentially of water and substantially all the solids in tea leaves which are soluble in hot water, the improvement which comprises adjusting the temperature of said mixture to a temperature in the range 45 to 100° F. and to a level at which the amount of insoluble "cream" in the mixture is about 5-25% of the total tea solids, and centrifuging said solution to remove substantially all of said solid material to produce a substantially clear solution of tea solids which are completely soluble and do not produce cloudiness at beverage strength in cold water.

References Cited in the file of this patent

UNITED STATES PATENTS

| 1,854,062 | Potter et al. | Apr. 12, 1932 |
| 2,235,700 | Eldred | Mar. 18, 1941 |
| 2,476,072 | Tressler | July 12, 1949 |

FOREIGN PATENTS

| 3,437 | Great Britain | Aug. 26, 1879 |
| 22,590 | Great Britain | of 1898 |
| 165,644 | Great Britain | July 7, 1921 |
| 559,758 | Great Britain | Mar. 3, 1944 |

UNITED STATES PATENT OFFICE
CERTIFICATE OF CORRECTION

Patent No. 2,891,865                                                    June 23, 1959

Edward Seltzer et al.

It is hereby certified that error appears in the printed specification of the above numbered patent requiring correction and that the said Letters Patent should read as corrected below.

Column 4, line 19, for "hit extractant" read -- hot extractant --;

column 7, line 46, before "temperatures" insert -- creaming --.

Signed and sealed this 10th day of November 1959.

(SEAL)
Attest:

KARL H. AXLINE                                                       ROBERT C. WATSON

Attesting Officer                                                Commissioner of Patents